Oct. 7, 1958  A. O. KRIER ET AL  2,855,058
LEAF CROP HARVESTER
Filed June 12, 1956  4 Sheets-Sheet 1
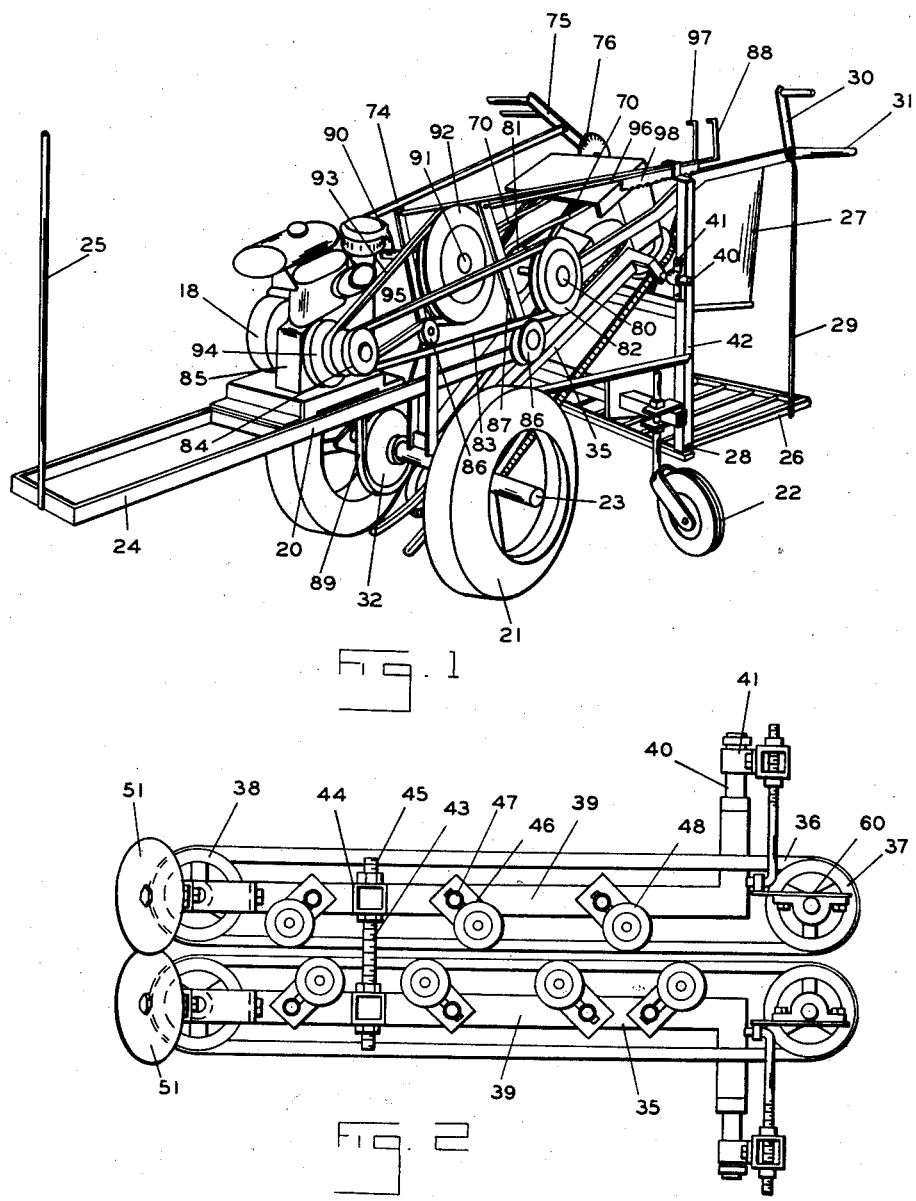
INVENTORS
ALEXANDER O. KRIER
JAMES W. ALLEN
DONALD L. WILLIAMS
BY CORBETT, MAHONEY, & MILLER,
ATTYS.

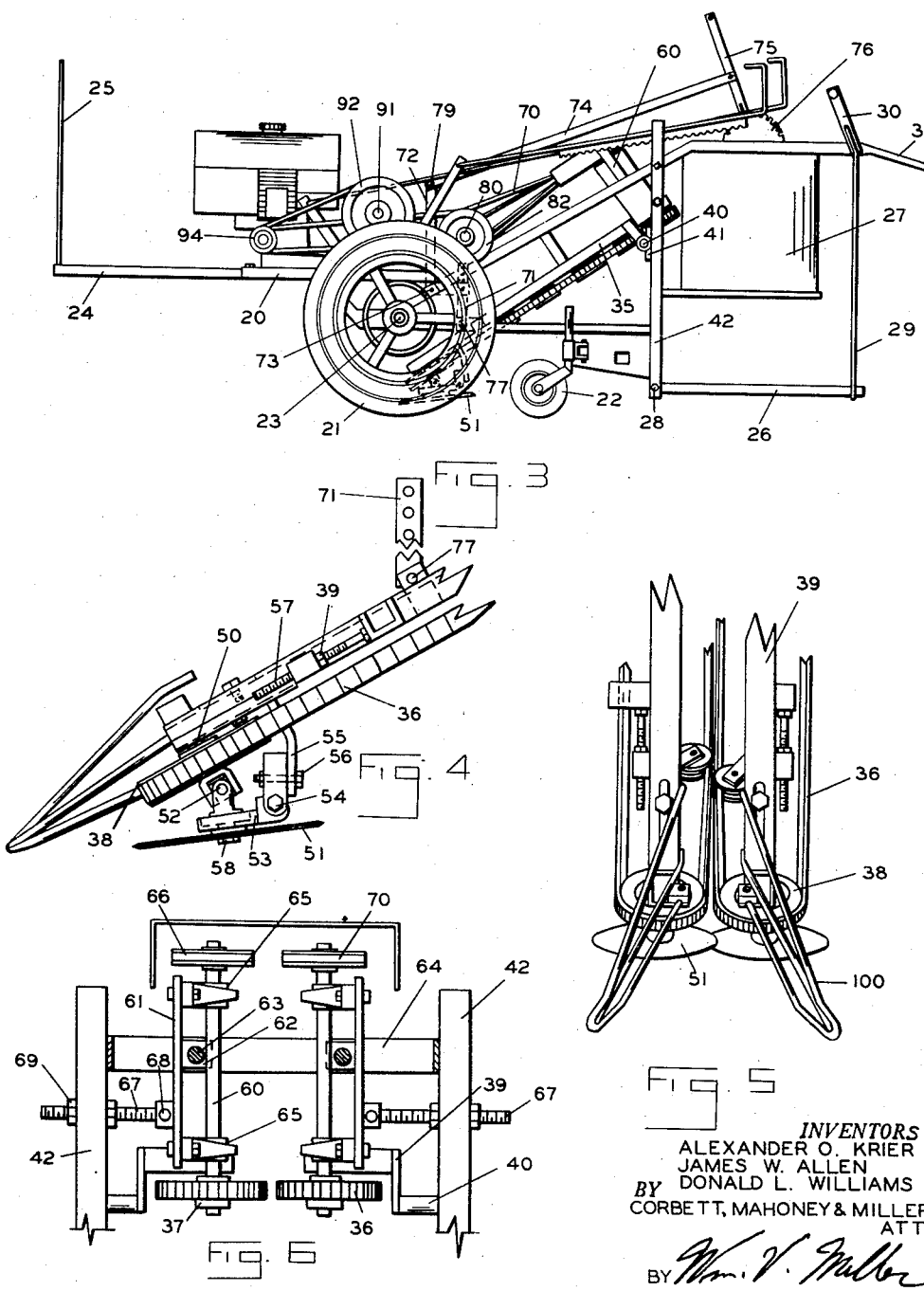

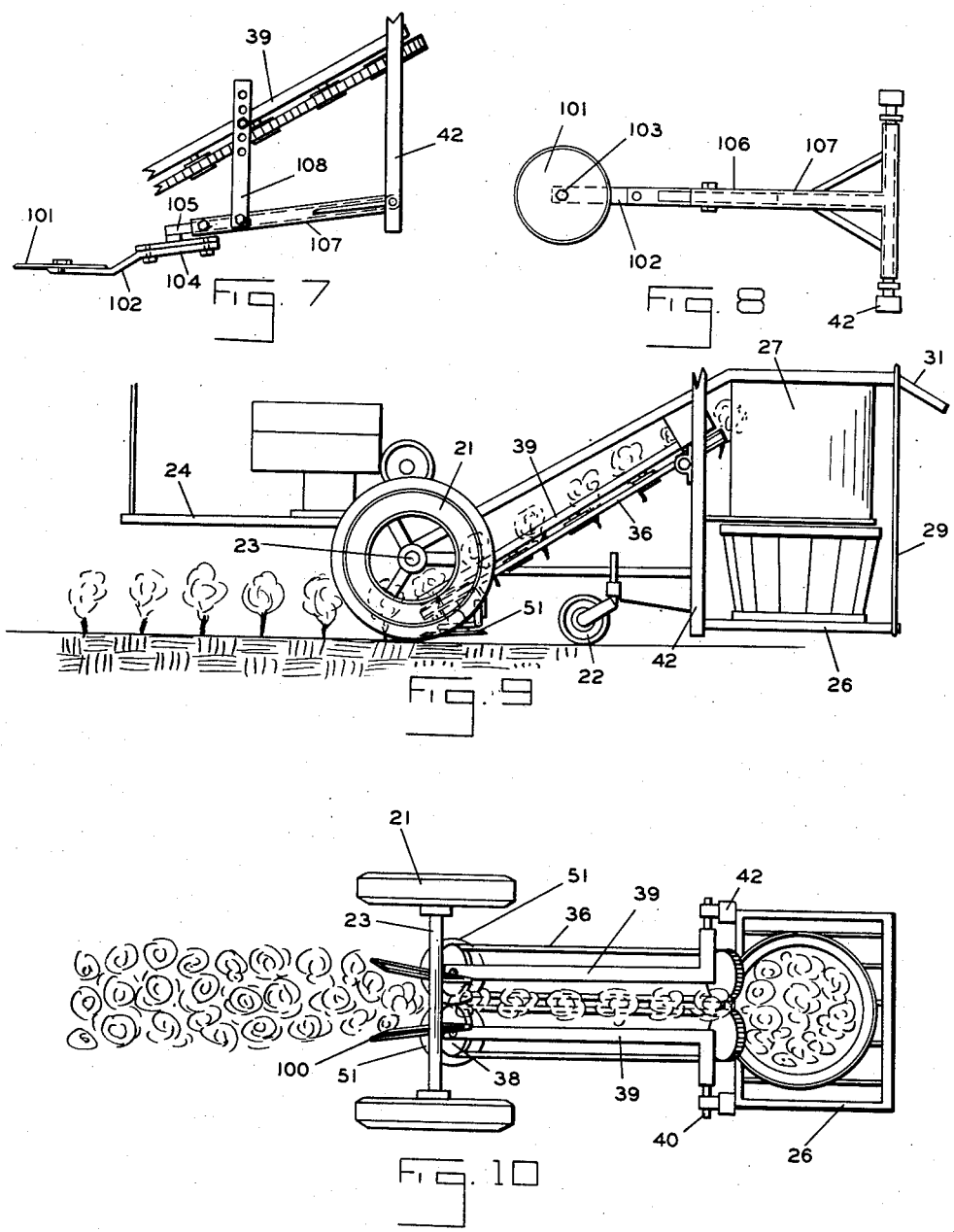

Oct. 7, 1958  A. O. KRIER ET AL  2,855,058
LEAF CROP HARVESTER

Filed June 12, 1956  4 Sheets-Sheet 4

INVENTOR.
ALEXANDER O. KRIER
JAMES W. ALLEN
BY DONALD L. WILLIAMS
CORBETT, MAHONEY & MILLER,
ATTYS.

United States Patent Office 2,855,058
Patented Oct. 7, 1958

2,855,058

LEAF CROP HARVESTER

Alexander O. Krier, James W. Allen, and Donald L. Williams, Columbus, Ohio

Application June 12, 1956, Serial No. 590,873

2 Claims. (Cl. 171—42)

Our invention relates to a leaf crop harvester. It has to do, more particularly, with a harvesting machine which can be moved along rows of a leaf crop, gather in clusters of the leaves, cut them from the plants, pick up the severed clusters of leaves, and convey them to a container on the machine, all without crushing or otherwise damaging the leaves so that they can be sold as a whole-leaf product. Our machine may be used for harvesting such leaf crops as spinach, mustard greens, kale, parsley, turnip greens, etc.

As far as we know, no machine has been provided in the past which would successfully harvest a leaf crop without substantial damage to the leaves. Machines which have been provided in the past have cut the leaves from the plant and gripped the leaves in such a manner as to damage them by cutting or crushing so that they would have to be sold as a shredded or pulverized product and not as a whole-leaf product. On the other hand, the machine of our invention will gather in clusters of the leaves, cut them from the plants and pick up the clusters of the leaves and will lift them to a point of discharge into a suitable container supported on the machine, without cutting the leaves themselves or crushing or otherwise damaging the leaves.

In the accompanying drawings, we have illustrated an example of our machine. It may take other forms in its general structure without departing from the principles involved in this invention and which are embodied in the structure set forth in the claims.

In the drawings:

Figure 1 is an isometric view of a machine constructed according to our invention.

Figure 2 is a bottom plan view of the pick-up conveyor arrangement provided on our machine.

Figure 3 is a side elevational view of our machine.

Figure 4 is a detail in side elevation of the leaf gathering guides and rotatable cutting discs associated with the lower ends of the pick-up conveyor and which sever the plants above the surface of the ground and indicating the means for varying the height of the lower end of the conveyor and associated parts.

Figure 5 is a front elevational view of the structure of Figure 4.

Figure 6 is a rear view of the pick-up conveyor and associated driving mechanism and indicating the means for adjusting the spacing of the rear or upper ends of the pick-up belts.

Figure 7 is a side elevational view of a cutting plow which will operate below the surface of the ground when it is desired to sever the plants in this manner instead of above the ground as with the rotatable blades of Figure 4.

Figure 8 is a side view of the plow of Figure 7.

Figure 9 is a diagrammatic side view illustrating the action of the machine when the rotatable blades are used for cutting off the plants above the surface.

Figure 10 is a plan view of the diagrammatic showing of Figure 9.

Figure 11:
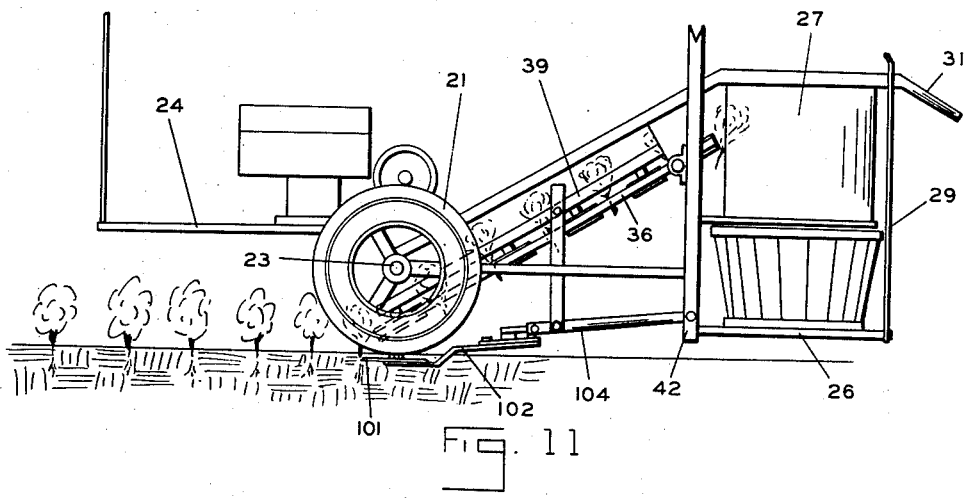
Figure 11 is a diagrammatic view similar to Figure 9 but showing the action of the machine when the plow is used for cutting off the plants below the surface.

With reference to the drawings, our machine is shown in Figures 1 and 3 as comprising a main frame 20 which is supported by a pair of forward driving and traction wheels 21 and by a pair of rear caster wheels 22, only one of the caster wheels being shown. The machine is substantially balanced about the axle 23 upon which the wheels 21 are axially adjustable. The frame 20 is provided with a forward extension 24 having an upstanding sight bar 25 thereon and this extension will serve as a support for counterbalance weights if needed. The frame 20 is also provided with a bushel-basket supporting rack 26 at its rear end at a low level upon which a leaf crop receiving bushel basket can be supported below a directing basket chute 27 carried on the rear end of the frame at a higher level. The chute 27 is open at its forward side and is fixed to the frame 20. The basket rack 26 is pivoted at its forward edge at 28 to the vertical posts 42 of the main frame 20 so that it can be raised or lowered about the pivot 28 to permit proper positioning of the basket relative to the lower end of the chute 27. The rack 26 is moved up and down about the pivot 28 by means of a suspending rod 29 which is pivoted to the rack 26 at its rear edge and to a hand lever 30 that is pivoted to the main handle structure 31.

The handle structure 31 is provided at the upper rear end of the main frame 20 for use by the operator in guiding the machine along the rows of the leaf crop, the machine being self-propelled by means of a gasoline engine 18 through a suitable belt type wheel-drive including sheave 32 keyed to the axle 23. In guiding the machine, the operator can sight the upper portion of the rod 24 to aid in keeping the machine on a straight path. The basket chute 27 is adapted to receive the leaf crop at its forward open side from the upper end of a pick-up conveyor 35. This conveyor is supported on the frame in an upwardly and rearwardly inclined position. It extends from a point closely adjacent the ground to a point directly ahead of the open front side of the chute 27. As will later appear from the detailed description, the upper end of the conveyor 35 is pivoted to the main frame so that its lower end can be adjusted vertically on the frame to different heights.

The conveyor 35, as shown best in Figure 2, is formed of a pair of endless V-belts 36 which have a compressible outer surface such as rubber. Each of the belts is carried by a driven sheave 37 at its upper end and an idler sheave 38 at its lower end which are supported for rotation about parallel axes. The belts 36 extend rearwardly and upwardly in substantially the same plane and are so arranged laterally relatively that their inner flights approach each other but, in operation, the surfaces thereof do not contact with each other because it is important not to crush the leaf plants picked up by the bolts.

Belt-supporting beams 39 are provided for supporting for vertical movement each of the lower sheaves 38. The upper end of each of these beams 39 is provided with a laterally outwardly extending trunnion 40 which rotatably fits in a pivot bracket 41. The brackets 41 (Figures 1 and 3) are secured to the forward sides of the vertical posts 42 at the rear end of the main frame 20. The lower ends of the beams 39 are adjustably secured together by means of a screw 43 which loosely passes through upstanding brackets 44 which extend upwardly from the beams and are rigid therewith. Back-up nuts 45 are provided on each side of the brackets 44. Thus, the spacing of the beams 39 at their lower ends and, consequently, the spacing of the lower ends of the belts 36 can be varied. Each of the belts 36 is maintained under proper tension by means of the belt-adjusting arms 46 which are connected by clamping bolt and slot connections 47 to the beams 39 and which carry the idler belt-tensioning pulleys 48.

As shown in Figure 4, each of the lower idler sheaves 38 is keyed on a forwardly inclined shaft 50 which is rotatably carried by the lower end of the beam 39. The shaft 50 is driven by means of the belt 36 which, in turn, is driven by means of the associated upper driving pulley 37. The shaft 50 also drives a plant cutting disc 51 which is adapted to sever leaf plants above the surface of the ground. The disc 51 is adjustable relative to the lower end of the associated belt 36, as indicated in Figure 4 and for this purpose the disc is connected to the lower end of the shaft by a driving universal joint 52. The disc 51 is adjusted about the transverse axis of the joint 52 by means of a bearing bracket 53, relative to which the disc 51 rotates, this bracket being pivoted at 54 to a depending arm 55 at the rear side of the disc. The bracket 53 is adjustably connected to the arm 55 by a clamping bolt and slot connection 56. The upper end of the arm 55 is slidably connected for longitudinal movement to the lower end of the beam 39 and is adjusted therealong and held in adjusted position by means of the adjusting screw 57 mounted on the beam and connected to the arm. The pair of discs 51 are of such size that in any adjusted operative position to which the belts 36 are spaced relatively, the discs 51 will overlap each other. The discs 51 can be removed readily by removing a clamping bolt 58 to permit complete removal or replacement.

Each of the upper sheaves 37 is carried on the lower end of a forwardly inclined drive shaft 60 (Figures 3 and 6). Each shaft 60 is carried by a pivoted bar 61 which is secured to a pivot block 62 intermediate its upper and lower ends. The block 62 is pivoted at 63 to a transverse frame member 64 which extends between the frame posts 42. At its upper and lower ends, each bar 61 carries the shaft bearings 65 in which the shaft 60 is rotatably mounted and the sheave 37 is keyed to the lower end of the shaft while its upper end has a drive pulley 66 keyed thereon. The bars 61 are adjustable towards and from each other to vary the spacing of the belts 36 at their upper ends. Each of the bars 61 is adjustable by means of a screw 67 pivotally connected to the bar at 68 and extending through the associated frame post 42, being adjustable relative thereto by the set of nuts 69 disposed on opposite sides of the post 42.

It will be apparent that the spacing of the belts 36 at their lower ends is accomplished by adjusting the screw 43 and this will produce no binding effect at the trunnions 40 since these members are free to slide axially in the pivot brackets 41. If the belt spacing is greater at their lower ends than at their upper ends, the belts will pivot about the axes of the drive shafts 60. Adjustment of the spacing of the upper ends of the belts 36 is accomplished by adjustment of the screws 67 and this will twist the belts slightly since the sheaves 37 will swing about the pivots 63, but insufficiently to have any effect on their conveying action on the leaf crop. The sheaves 66 will be driven by belts 70 passing therearound and they may be twisted slightly also but this will not interfere with their driving action. Adjustment of the cutting discs 51 is for maintaining these discs substantially parallel to the surface of the ground and is accomplished by means of the screws 57 and this adjustment is accomplished without interfering with the drive for the discs 51.

A vertical adjustment of the lower end of the conveyor 35 is provided so that the lower end of the belts 36 and the cutting discs 51 can be adjusted vertically in accordance with the type of leaf plants being harvested, that is, whether they are short or tall. This adjustment is accomplished by raising or lowering the lower ends of the beams 39 to cause them to swing vertically about the axis of the trunnions 40. For making this adjustment and for supporting the lower end of the conveyor at adjusted positions, we provide the link 71 which has its lower end pivotally connected at 77 between the beams 39 (Figures 3 and 4) and its upper end adjustably pivotally connected at 78 to the rear end of the rearwardly extending arm of a bell-crank lever 72. This bell-crank lever 72 is pivoted at 73 to the frame extension 20 and the upper end of its upstanding arm is pivotally connected to an actuating bar 74 at 79. The rear end of this bar 74 is pivoted to a hand lever 75 pivotally mounted on the handle structure 31 and having a ratchet lock 76 associated therewith. Moving the handle 75 forwardly will raise the lower end of the conveyor 35 and moving it rearwardly will lower such end of the conveyor.

The belts 70 (Figures 1 and 3) run from the conveyor driving sheaves 66 to a jack shaft 80 and pass around sheaves 81 keyed to said shaft. This shaft is driven by means of a sheave 82 keyed thereon which receives a drive belt 83 that extends from a sheave 84 driven from a gear box 85 disposed adjacent and driven by the engine 18. The drive belt 83 passes loosely around the sheaves 82 and 84 but is tightened into driving relationship therewith by means of an idler sheave 86 carried on the lower end of an actuating arm 87 which is pivoted to the frame 20. This arm is swung about its pivot by an actuating rod which is pivoted to the upper end thereof and which extends rearwardly and is provided with an upstanding handgrip 88 adjacent the handle structure 31. The wheel driving sheave 32 is driven by means of a belt 89 which passes around a sheave 90 carried by a jackshaft 91 that also carries a sheave 92. A drive belt 93 passes loosely around this sheave 92 and a sheave 94 driven by the gear box 85. The belt 93 is tightened by means of an arm 95, similar to the arm 87, and actuated by means of a rod provided with the handgrip 97 adjacent the grip 88. The actuating rods which are provided with the handgrips 88 and 97, respectively, are slidably mounted on the handle structure 31 and are provided with ratchet locks 98. This handgrip 88 is used for actuating the drive to the conveyor 35 and the handgrip 97 is used for actuating the drive to the propelling wheels 21.

As shown in Figure 5, for gathering in the leaf crop and directing it between the rotatable cutting discs 51, we provide the gathering guides 100. These guides are rigidly attached to the lower ends of the beams 39 and project downwardly and forwardly therefrom in diverging relationship. As the machine is moved along, they will gather in the leaves of the plants and direct the plants between the cutting blades 51 and the lower ends of the conveyor belts 36.

In most cases, the blades 51 will be used to cut the leaves from the root stems of the plants at a level above the surface of the ground. However, it is sometimes desirable to cut the plants from the roots at a level below the surface of the ground. In the latter case, the blades 51 are removed and a cutting plow of the type shown in Figures 7 and 8 is employed.

This plow is in the form of a disc 101 which is clamped to the forward end of an arm 102 by a bolt 103. It is provided with a cutting edge around its entire periphery so that it can be rotatively adjusted to present different portions of its cutting edge to act on the plants. The arm 102 is provided with a rearwardly and upwardly extending part 104. The rear end of this part 104 is non-rotatably fastened to a rod section 105 which is non-rotatably mounted in the forward end of a tube 106. This tube 106 forms a part of a plow-supporting frame 107 which is pivotally secured between the posts 42 of the main frame 20 for vertical swinging movement. The plow-supporting frame 107 is attached to the conveyor 35 for vertical movement therewith by a link 108 which is pivotally attached to the frame 107 at its lower end and adjustably between the beams 39 at its upper end.

Due to the shape of arm 102, the plow disc 101 will be substantially horizontally disposed.

As previously indicated, when the crop is to be harvested by severing the leaves from the plants at a level above the surface of the ground, the rotatable cutting discs 51 are used. The hand lever 75 is adjusted to position the lower end of the conveyor 35 and the discs 51 at the proper level. The conveyor belts 36 are adjusted so that they are spaced properly relative to each other in order to gently grasp clusters of the blades without crushing them. The belts 36 are never adjusted into contact with each other because it is not desirable to firmly grip the leaves which would crush them. As the machine is moved along, it will function as indicated in Figures 9 and 10. The guides 100 will gather in the leaves and direct the plant stems between the cutting blades 51 which will be driven towards each other and rearwardly, that is, the left disc 51 will be driven in a counterclockwise direction and the right disc 51 will be driven in a clockwise direction as viewed from Figure 5, it being understood that at this time the hand grips 88 and 97 have been pulled rearwardly to engage the drive for the wheels 21 and the belts 36. The inner flights of the belts 36 will be moving upwardly and rearwardly. The plants are severed by the discs 51 as the machine advances at a level above the surface of the ground and clusters of the leaves are gathered in between the belts and carried upwardly and rearwardly by the conveyor 35 as illustrated in Figures 9 and 10. They are discharged from the upper end of the conveyor 35 into the chute 27 which will direct them into a basket supported therebelow on the rack 26. The spacing of the belts 36 can be varied and the height of the discs 51 and the lower end of the conveyor 35 above the ground can be adjusted in accordance with the height of the plants being harvested. Regardless of the level of the lower end of the conveyor 35, the discs 51 may be adjusted into horizontal position and will still be properly driven due to the universal joints 52.

Figure 12:
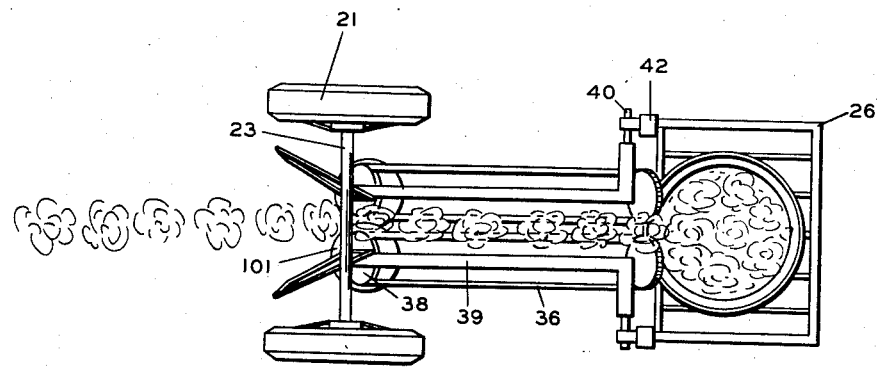
Figure 12 is a plan view of the diagrammatic showing of Figure 11.

If the ground is loose, it is sometimes desirable to cut the plants from the roots below the surface of the ground. In this case, the discs 51 are removed and the plow 101 is attached. The plow is adjusted to the desired level by means of adjusting the height of the lower end of the conveyor 35. As the machine is now advanced, it will act in the manner illustrated in Figures 11 and 12. The blade 101 will travel below the surface and engage the stems of the plants and sever them. The plants will be guided between the spaced lower ends of the conveyor belts 36 by the guides 100 and will be picked up gently in clusters as before. They will be conveyed rearwardly and upwardly, as indicated in Figure 11, and will be discharged into the chute 27 from the upper end of the conveyor. Because of the particular mounting of the plow blade 101, it will be substantially horizontally disposed regardless of the depth to which it is adjusted.

It will be apparent that we have provided an efficient machine for harvesting leaf crops and which will function on movement of the machine in one pass over rows or patches of the crop to completely harvest the crop without waste. The machine is so designed that it will gather in the leaves, sever them from the plants, and then convey them upwardly and rearwardly in clusters without gripping them to cause damage thereto. The machine can be adjusted readily for different types of plants or different types of soil so that it can operate to sever the plants above the surface or below the surface.

Various other advantages will be apparent.

Having thus described our invention, what we claim is:

1. A leaf crop harvester comprising a frame carried by supporting members for movement along the ground in cooperative relationship with the leaf crop to be harvested, a rearwardly and upwardly extending conveyor mounted on said frame and comprising endless belts in transversely spaced relationship and between which the leaf crop is guided as the frame moves along, adjusting mechanism carried by the frame and connected to the conveyor for raising and lowering the lower end of said conveyor, cutting discs for severing the leaves from the plants as they are guided between the lower ends of the belts, said cutting discs being supported adjacent the lower ends of the belts and the discs having their edges overlapping with the space between the converging leveling edges thereof substantially in alignment with the space between the belts, units for rotatably supporting said discs and for positively counterrotating said discs, each of said units comprising a shaft on the lower end of said conveyor which has a pulley keyed thereon that supports one of said conveyor belts at the lower end of the conveyor, a universal driving joint carried by the lower end of said shaft and supporting one of said cutting discs for driving the disc, and adjusting mechanism independent of the conveyor adjusting mechanism for angularly adjusting said disc relative to the lower end of the associated belt and maintaining such adjustment and including an adjustable connection rotatably connected to said universal joint and connected to said conveyor whereby said cutter disc may be adjusted angularly relative to the belt in accordance with the vertical adjustment of the lower end of the conveyor.

2. A leaf crop harvester according to claim 1 in which said adjustable connection between each disc-supporting universal joint and the conveyor comprises a bearing bracket rotatably receiving the lower end of the universal joint, an adjusting member mounted on the conveyor for movement longitudinally thereof and connected to both of the bearing brackets of the two discs, and means on the conveyor and connected to said adjusting member for moving it longitudinally of the conveyor to simultaneously angularly adjust both of said discs.

References Cited in the file of this patent

UNITED STATES PATENTS

| 2,075,311 | Stockl et al. | Mar. 30, 1937 |
| 2,314,681 | Beatty | Mar. 23, 1943 |
| 2,436,831 | Silva | Mar. 2, 1948 |
| 2,514,338 | Roberts | July 4, 1950 |
| 2,693,069 | Krier | Nov. 2, 1954 |